July 28, 1959 R. M. HEMPEL 2,896,432
BEARING SEALS FOR UNIVERSAL JOINTS
Filed March 11, 1955
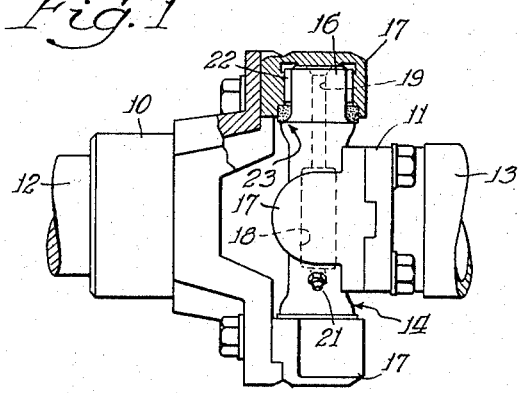
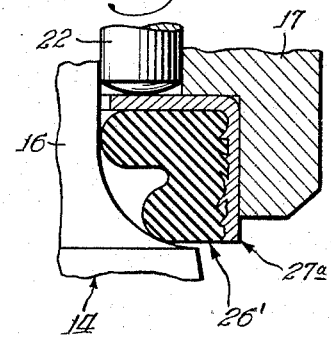
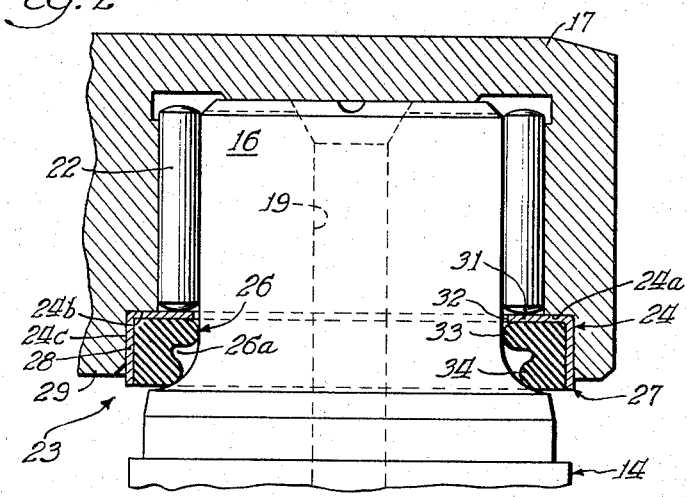
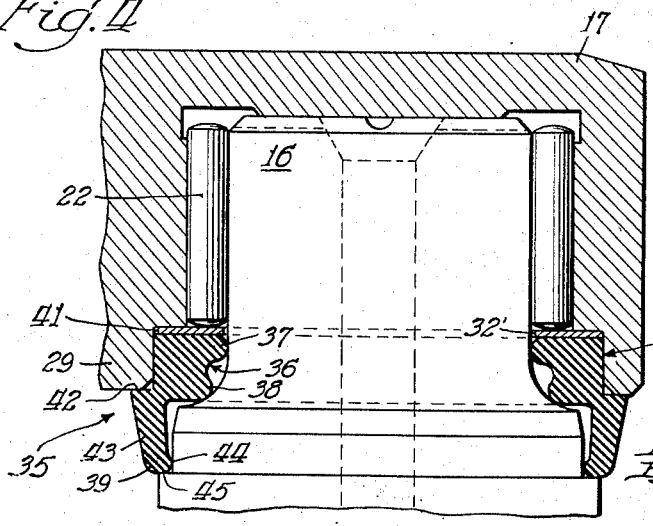
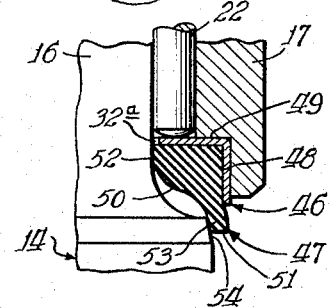
Inventor:
Rudolph M. Hempel
By:
H. J. Schmid Atty.

United States Patent Office 2,896,432
Patented July 28, 1959

2,896,432

BEARING SEALS FOR UNIVERSAL JOINTS

Rudolph M. Hempel, Palatine, Ill., assignor to Borg-Warner Corporation, Chicago, Ill., a corporation of Illinois Application March 11, 1955, Serial No. 493,800

3 Claims. (Cl. 64—17)

This invention relates to lubricant seals for universal joints transmitting torque from one yoke to another yoke by an intermediate spider having trunnions journalled in bearing cups mounted on the arms of the yokes, bearing elements such as roller bearings, being interposed between the trunnions and the bearing cups individual thereto.

It is an object of the invention to provide a seal for universal joints as described and having structure for sealing the bearing cup and spider trunnion so as to prevent the introduction of soil matter into the bearing cup and to preclude the escape of lubricant from the bearing cup, and functioning to retain the roller bearings in assembly with the bearing cup and trunnion and to provide a thrust surface therefor.

It is another object of the present invention to provide a universal joint bearing seal of relatively simple design and capable of manufacture at low cost.

Another object of the present invention is to provide a seal for a universal joint capable of retaining bearing elements in assembly with the bearing cup and trunnion.

A further object of the present invention is to provide a seal for a universal joint in which the seal comprises a resilient element acting as a one-way valve opening to permit used lubricant to be ejected from the joint by new lubricant forced into the joint under pressure and automatically closing to prevent the escape of the new lubricant from the joint upon the cessation of pressure application to the new lubricant.

A further object of the present invention is to provide a seal for a universal joint in which a plurality of separate and distinct sealing surfaces are provided by the seal to prevent the possibility of lubricant or foreign matter, in the event it should pass a primary or first sealing surface, from passing a second sealing surface to provide a safety factor insuring retention of lubricant and exclusion of foreign matter.

A further object of the present invention is to provide an annular bearing seal molded from vulcanizable synthetic rubber or plastic material and having a metallic roller bearing-supporting plate bonded thereto.

A seal embracing certain features of the present invention may be used for a universal joint having a pair of opposed yokes, an intermediate spider having radially extending trunnions, bearing cups mounted on the yoke members for receiving the trunnions to operatively connect the yokes, roller bearings disposed between the trunnions and the bearing cups, the seal comprising an annular member having a metallic backing element bonded thereto disposed in and engaging the cup, and the rubber seal having a configuration in cross-section defining a plurality of beads or lips, each making line contact with a trunnion whereby a plurality of sealing surfaces are provided between the bearing cup and the trunnion.

Other objects and advantages of the present invention will become more apparent from the following specification when considered in conjunction with the appended drawing wherein the same reference numerals designate similar parts throughout the several views and in which:

Fig. 1 is a side elevation, partly in section, of a universal joint embodying the present invention;

Fig. 2 is an enlarged view of a portion of Fig. 1 shown in section in Fig. 1 and illustrating one embodiment of the present invention, the resilient seal and metal bearing support being bonded or held by pressure in position in a universal joint; and Fig. 3 is a view similar to Fig. 2 showing a portion thereof with the seal being connected to the metal support by tangs or deformed portions of the support entered into the seal;

Fig. 4 is a view similar to Fig. 2 illustrating another modification of the invention;

Fig. 5 is a fragmentary view of a further modification of the invention.

The present invention is primarily directed to the construction and design of a seal for closing the annular opening between a bearing cup and its trunnion in a universal joint, and, for this purpose, only those portions of the joint which relate directly to the present invention will be described in detail. It is not intended that the present invention be restricted in its application to the particular universal joint shown herein since it is contemplated that the invention will be utilized on a wide variety of applications in which it is desirable to seal relatively rotating parts.

Referring to Figs. 1 and 2, the universal joint has two opposed yokes 10 and 11 suitably connected to driving and driven shafts 12 and 13 respectively. Interposed between the yokes 10 and 11 is a spider element 14 having four radially extending trunnions 16 received in bearing cups 17 secured to the yokes. Received within each bearing cup and surrounding the adjacent cylindrical surface of the trunnion are a plurality of roller bearings 22. The spider 14 is formed with a hollow central cavity 18 communicating with passages 19 formed in the spider trunnions. A grease fitting 21 secured to the spider 14 communicates with the cavity 18 to introduce lubricant through the passages 19 of the trunnions and into each bearing cup simultaneously thus lubricating the roller bearings 22 interposed between the cylindrical surfaces of the bearing cups and the trunnions. A seal generally indicated at 23 surrounds each trunnion in the region of the mouth of each bearing cup 17 so as to retain lubricant introduced and to preclude the admission of foreign material into the cup.

The present invention is directed primarily to the design and construction of the seals shown in detail in the different views in the drawing. In the embodiment of the invention shown in Figs. 1 and 2, a bearing cup 17 receives and forms a housing for that portion of a trunnion 16 defining the cylindrical surface thereof. Disposed between the trunnion 16 and the cup 17 are the roller bearings 22 for providing a generally frictionless connection between the adjacent concentric cylindrical surfaces of the trunnion and the bearing cup. The lower end of the cup 17 is formed with a counterbore generally indicated at 24 defined by a shoulder 24a provided by a flat surface 24b at one end of and intersecting the enlarged cylindrical surface 24c. Disposed in the counterbored portion 24 is a resilient ring 26 molded from either a natural rubber, plastic material such as nylon, or a synthetic rubber material such as Buna-N or neoprene. Referring to Fig. 2, the ring 26 may be held in engagement in any manner, such as being bonded by a cement to an annular cuplike sheet metal backing element 27, or the ring 26 may be inserted within the element 27 and held in position by the resilient engagement of the ring with the element and retained in position in the joint by compression of the ring in the element. Alternatively, the ring 26 may be mechanically connected to the element 27ᵃ by deformed portions of the element, by providing a knurled surface on element 27 or tangs, struck from the inner surface of the element and penetrating into the ring 26', as shown in Fig. 3. The composite connected ring and backing element assembly is inserted in the counterbore (24) of the bearing cup, containing the roller bearings held by grease in the cup, and this unit is then positioned on the trunnion, the cylindrical portion 28 of the backing element engaging the cylindrical surface 24ᶜ of the wall 29 of the bearing cup by a press fit. The horizontal flat portion 31 of the backing element engages the surface 24ᵇ of the cup and also engages the lower ends of the roller bearings 22 to position and hold the bearings in operative relation with the cup and trunnion, as shown, and serves to space the roller bearings from contact with the ring 26. The horizontal portion 31 of the element 27 is spaced from the periphery of the trunnion 16 so as to provide an annular passageway 32. The annular ring is formed to provide two ridges or lips 33 and 34 extending completely about the inner circumference of the ring, the ridges 33 and 34 being separated by a groove 26ᵃ to permit flexing of the lips 33 and 34 for a purpose to be described. This will be apparent from the configuration of the ring 26 which, in cross-section, defines the two lips 33 and 34. Each of the lips 33 and 34 have generally arcuate surfaces which make circular contact with the trunnion 16 when the cup 17 and the trunnion are snugly assembled thus establishing a primary and a secondary sealing surfaces of the lips 33 and 34 to positively insure retention of lubricant in the bearing cup for the roller bearings and prevention of foreign matter, such as dust, entering the bearing cup.

It is customary to purge all bearing cups of used lubricant at the same time fresh new lubricant is introduced under pressure through the grease filling 21, the cavity 18 and the bores 19, and, for this reason, the metallic backing element 27 is slightly spaced from the outer diameter of the trunnion to provide the annular passageway 32. The resilient lips 33 and 34 tightly engage the trunnion but will deform and deflect sufficiently to permit the passage of lubricant under pressure between the ring 26 and the trunnion to the atmosphere. Upon cessation of forcing the lubricant under pressure into the joint, lip 33 and lip 34 will flex to resume their shapes as shown in Fig. 2 and engage the trunnion to serve as both primary and secondary seals against the loss of lubricant from the interior of the bearing cup 17. Correspondingly, the lip 34 and the lip 33 also serve as both primary and secondary seals to prevent the admission of fluids such as water, and foreign matter, such as dust or mud, exterior of the universal joint, entering the bearing cup cavity.

Referring now to the embodiment of the invention shown in Fig. 4, it is apparent that the seal, indicated generally by the numeral 35, is formed as a resilient ring 36 having three lips 37, 38 and 39 respectively. In this embodiment of the invention, the ring is also formed of either natural rubber, plastic material such as nylon, or a synthetic rubberlike material such as Buna-N or neoprene, and held in engagement in any manner, such as being bonded by a cement to a flat sheet metal backing plate or ring 41. The ring 36 may also be attached by a mechanical connection to the plate 41 as by providing tangs struck from the bottom surface of the plate 41 and inserted in the ring 36. The ring 36 is formed at its lower end with a shoulder 42 engaging the bottom of the bearing cup 17. The combined backing plate and resilient ring assembly is positioned in the bearing cup and the ring is compressed to position it in the cup, with the shoulder 42 of the ring snugly engaging the end of the side wall 29 of the bearing cup. This unit is then placed on the trunnion. Lips 37 and 38 of the ring 36 engage the trunnion 16 and function in the same manner as do the lips 33 and 34 of the ring 26 in the embodiment of Figs. 1 and 2. If desired, the ring 36 and plate 41 may be positioned separately in the bearing cup, the compression of the ring retaining the plate and ring in assembly with the cup. It is to be noted the lip 39 is formed on a depending skirt 43 integral with the ring 36 and engages the trunnion 16 and makes circular contact therewith at the points, indicated by the reference numerals 44 and 45, on a shoulder of the trunnion thus providing two seals in addition to the two seals provided by the lips 37 and 38. Accordingly, the embodiment of the invention shown in Fig. 3 provides a quadruple seal closing the mouth of the bearing cup and is particularly advantageous in applications where extremely adverse atmospheric and soil conditions are encountered by vehicles using universal joints.

Fig. 5 illustrates a seal ring and bearing support assembly comprising a metal bearing support 46, identical to the support 27 in Fig. 2, and a resilient seal ring 47 having its angularly related sides 48 and 49 secured to the support 46 as previously described with respect to Fig. 1, or the ring may be compressed in the support 46 to hold the ring in the support, prior to the positioning of the assembly in the cup 17 wherein it will be held by a press fit between the support and cup. The resilient ring 47 has its inner circumferential surface 50 defined by an S-shaped profile between the radially outer side 49 and the radially inner side 51 to provide a lip 52 engaging the trunnion 16 and a lip formed by a depending portion or skirt 53 overlying the frusto-conical surface 54 of the trunnion.

In this embodiment of the invention, the lip 52 and lip or skirt 53 will flex to allow fresh lubricant under pressure to enter the roller bearing-holding cavity in the cup and to force the used lubricant therefrom through the passage 32ᵃ between the trunnion and the annular support 46, between the flexed lip 52 and trunnion and thence between the lip or skirt 53 and the trunnion to the atmosphere. It will be noted that the lip or skirt 53, as does the lip or skirt 39 in Fig. 4, moves outwardly of the trunnion by a hinge action to allow the used lubricant to bleed freely from the joint during forcing of the new lubricant under pressure into the joint. When the fresh lubricant, generally of a lighter or different color than the used lubricant, emerges from the joint, the operator stops the flow of the fresh lubricant into the joint. At such time, the lip 52 expands to engage the trunnion to prevent the escape of lubricant from the joint in operation and the skirt or lip portion of the seal ring flexes to overlie and tightly engage the trunnion to exclude dust, water and the like from the joint in operation.

It is to be noted that in the various embodiments of the present invention, the resilient seal rings permit satisfactory and expeditious lubrication of the universal joint, as the lips act as one-way valves to permit lubricant to be introduced under pressure to each bearing cup through the passageways 19 to purge each cup simultaneously of air or used lubricant without any danger of dislodging the seals. The used lubricant, contained within the bearing cup, is forced by the new lubricant through the annular passageway 32, 32' and 32ᵃ and past the deflected lips 33 and 34 of ring 26 or the lips 37, 38 and skirt 39 of ring 36, or the lip 52 and skirt 53 of ring 47, as the case may be, to the atmosphere, and, upon the cessation of the pressure-moved lubricant, the lips and the skirts then flex to return to their shapes as shown in Figures 2, 3, 4 and 5 in which they expand to tightly engage the trunnions.

It is thus apparent that seals have been provided which are relatively inexpensive to manufacture, sufficiently rigid to retain the roller bearing in assembly with the trunnion and bearing cup and to bear the end thrust developed in the roller bearings, while retaining lubricant in the universal joint and excluding foreign matter from the joint. Another inherent feature, of course, is the provision of a seal of the type described where all bearings of a universal joint or the like may be lubricated simultaneously without having to remove the seal.

A further advantageous feature of the seals is the bonding, or mechanical connection, or compression, of holding the metal backing plate and resilient ring in assembly to provide a self-contained composite structure adapted for ready application to bearing cups of universal joints.

While the present invention has been described in connection with several specific embodiments thereof, it is to be understood that such description is primarily for the purpose of illustrating the invention and is not to be construed as amounting to a limitation thereof. It is anticipated that there may be many modifications in the present invention without departing from the spirit and scope thereof.

I claim:

1. A lubricant seal adapted to prevent the leakage of lubricant between a trunnion and bearing cup of a universal joint and wherein the trunnion has a cylindrical portion merging into a outwardly flaring base portion, said seal comprising a one piece annular sealing ring adapted to engage said bearing cup and to surround said trunnion near the base thereof and including at least two spaced resilient lips, one of said lips adapted to engage said cylindrical portion of said trunnion and the other of said lips being of greater diameter than said one lip and adapted to engage said outwardly flaring base portion.

2. A lubricant seal adapted to prevent the leakage of lubricant between a trunnion and bearing cup of a universal joint and wherein the trunnion has a cylindrical portion merging into an outwardly flaring base portion, said seal comprising a one piece annular sealing ring fixedly secured to an annular metallic member having angularly related portions and adapted to engage said bearing cup and to surround said trunnion near the base thereof and including at least two spaced resilient lips, one of said lips adapted to engage said cylindrical portion of said trunnion and the other of said lips being of greater diameter than said one lip and adapted to engage said outwardly flaring base portion.

3. A lubricant seal adapted to prevent the leakage of lubricant between a trunnion and bearing cup of a universal joint and wherein the trunnion has a cylindrical portion merging into an outwardly flaring base portion, said seal comprising a one piece annular sealing ring fixedly secured to an annular metallic member having angularly related portions and adapted to engage said bearing cup and to surround said trunnion near the base thereof and including at least two spaced resilient lips, one of said lips adapted to engage said cylindrical portion of said trunnion and the other of said lips being of greater diameter than said one lip and adapted to engage said outwardly flaring base portion, said annular metallic member having projections on at least one of said portions extending within said resilient member.

References Cited in the file of this patent

UNITED STATES PATENTS

| | | |
|---|---|---|
| 2,113,998 | Swenson | Apr. 12, 1938 |
| 2,145,928 | Heinze et al. | Feb. 7, 1939 |
| 2,285,623 | Swenson et al. | June 9, 1942 |
| 2,316,713 | Procter | Apr. 3, 1943 |
| 2,338,169 | Dunn | Jan. 4, 1944 |
| 2,350,697 | Petch | June 6, 1944 |
| 2,719,045 | Grubenmann | Sept. 27, 1955 |
| 2,743,950 | Helfrecht et al. | May 1, 1956 |
| 2,802,351 | Anderson | Aug. 13, 1957 |

FOREIGN PATENTS

| | | |
|---|---|---|
| 705,009 | Great Britain | Mar. 3, 1954 |